United States Patent [19]

Oshima et al.

[11] Patent Number: 5,601,487
[45] Date of Patent: Feb. 11, 1997

[54] ELECTRONIC GAME DEVICES AND METHODS

[75] Inventors: Jun Oshima, Akigawa; Eri Kakimoto, Tokyo, both of Japan

[73] Assignee: Casio Computer Co., Ltd., Tokyo, Japan

[21] Appl. No.: 446,407

[22] Filed: May 22, 1995

[30] Foreign Application Priority Data

May 31, 1994 [JP] Japan .................................. 6-139710

[51] Int. Cl.$^6$ ........................................................ A63F 9/24
[52] U.S. Cl. ............................................... 463/4; 463/31
[58] Field of Search ................................... 273/433–438, 273/460, DIG. 28, 85 G, 87 R, 88, 94; 364/410; 395/152; 463/4, 31

[56] References Cited

U.S. PATENT DOCUMENTS

| | | | |
|---|---|---|---|
| 4,341,383 | 7/1982 | Reichert | 273/85 G |
| 4,372,556 | 2/1983 | Minkoff et al. | 273/85 G |
| 4,422,639 | 12/1983 | Del Principe et al. | 273/85 G X |
| 4,504,055 | 3/1985 | Wells | 273/87 R X |
| 4,521,014 | 6/1985 | Sitrick . | |
| 5,026,058 | 6/1991 | Bromley | 273/85 G X |
| 5,111,409 | 5/1992 | Gasper et al. | 434/169 X |
| 5,287,446 | 2/1994 | Williams et al. | 395/152 |
| 5,390,937 | 2/1995 | Sakaguchi et al. . | |
| 5,435,554 | 7/1995 | Lipson | 273/434 X |

FOREIGN PATENT DOCUMENTS

| | | | |
|---|---|---|---|
| 0634727 | 1/1995 | European Pat. Off. . | |
| 2163929 | 3/1986 | United Kingdom | 273/85 G |

*Primary Examiner*—Jessica Harrison
*Assistant Examiner*—Michael O'Neill
*Attorney, Agent, or Firm*—Frishauf, Holtz, Goodman, Langer & Chick

[57] ABSTRACT

In an electronic device, a plurality of images of each of the parts which constitute a character is contained along with a corresponding plurality of different parameters in a ROM. A parameter indicative of a character created by a controller is calculated from parameters corresponding to the respective images of the parts which constitute the character. The indication of an indicator which sets the progress of a game is controlled in accordance with the calculated character parameter. In more detail, first, the user selects images of the parts stored in the ROM and creates a character used in the game with those selected part images. The controller reads parameters corresponding to the images of the parts of the character and calculates a parameter of the character from those read parameters. A display displays an indicator which controls the progress of the game. The indicator changes at a speed corresponding to the calculated parameter. The indication of the indicator is determined by the operation of the user. Since the progress of the game is controlled in accordance with the indication of the indicator, the user himself is permitted to participate in the progress of the game.

15 Claims, 20 Drawing Sheets

ROM15

| PART \ NO. | 1 | 2 | 3 | |
|---|---|---|---|---|
| CONTOUR | PARAMETER 10 | 15 | 20 | |
| |  |  |  | |
| HAIR STYLE | 5 | 10 | 15 | |
| |  |  |  | |
| EYEBROWS | 30 | 40 | 50 | |
| |  |  |  | |
| EYES | 5 | 15 | 20 | |
| |  |  |  | |

FIG.3

RAM 17

| DISPLAY REGISTER | | | | | |—171
| M | | | | | |
| NAME | CON-TOUR | HAIR STYLE | EYE-BROWS | EYES | |
| NOSE | MOUTH | CON-TROL | DE-FENSIVE FORCE | LUCK | |
| Mr. YAMADA | 2 | 1 | 3 | 1 | |
| 5 | 4 | 20 | 55 | 30 | |
| Mr. SUZUKI | 5 | 7 | 1 | 4 | |
| 1 | 3 | 40 | 20 | 30 | |

- 173 → M
- 175 (table area)
- 177 → DATA AREA OF THIS SIDE
- 179 → DATA AREA OF THE OTHER SIDE

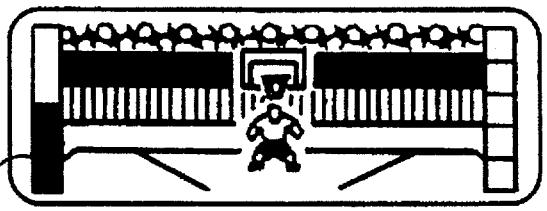
FIG.19A
271
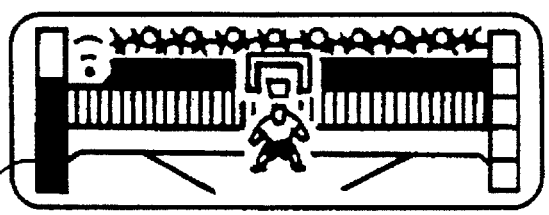
FIG.19B
271
FIG.20
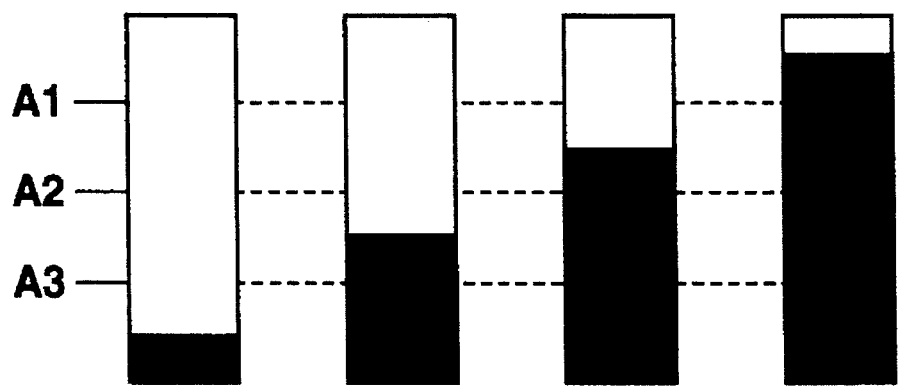
(A) (B) (C) (D)

ELECTRONIC GAME DEVICES AND METHODS

BACKGROUND OF THE INVENTION

The present invention relates to electronic game devices, and more particularly to an electronic game device and method for playing a game, using selected or created characters.

Conventionally, electronic game devices are known which create portrait images by combining beforehand stored images of the respective parts of the face of a human being, an animal, etc., and play a game, using the portrait images.

In an electronic game device of this kind, the progress of the offense/defense of a game is controlled on the basis of parameters obtained from numerical values allocated to the respective part images which constitute a portrait. Thus, there is the problem that the users cannot directly influence the result of the game and that the game is monotonous and not interesting.

SUMMARY OF THE INVENTION

It is therefore an object of the present invention to provide a game device and method in which the user is able to directly participate in and influence the progress and result, respectively, of the game to thereby provide an interesting game.

In order to achieve the above object, the present invention provides an electronic game device comprising:

storage means which contains a plurality of character data and a like number of score data each allocated to a respective one of items of the character data in a corresponding relationship;

select means for selecting a character data item from among the character data contained in the storage means;

display means for changing displayed data at a speed depending on a score data item corresponding to the character data item selected by the select means;

externally operated switch means; and game control means for controlling the progress of the game after the externally operated switch means is operated in accordance with the displayed data on the display means present when the externally operated switch means is operated.

In order to achieve the above object, the present invention provides an electronic game method, using a device which includes a display, and a storage which contains a plurality of different scores and a like number of characters in corresponding relationship, comprising the steps of:

selecting one of the characters contained in the storage;

displaying an indicator on the display;

changing the displayed contents of the indicator at a speed depending on a score allocated to the selected character;

stopping the indicator in response to an external operation; and controlling the progress of the game in correspondence to the displayed contents of the stopped indicator.

Therefore, according to the present invention, the progress of the game is controlled on the basis of the score allocated to the character (game player) as well as the indication of the indicator stopped by the user, so that the user himself is able to participate in the progress of the game.

BRIEF DESCRIPTION OF THE DRAWINGS

FIG. 3 shows an illustrative structure of a RAM of FIG. 1;

FIGS. 19A and 19B each show a further illustrative scene occurring in the game;

FIG. 20 shows an example of a display on a shoot power level meter;

DESCRIPTION OF THE PREFERRED EMBODIMENTS

Several preferred embodiments of an electronic game device and method according to the present invention will be described next with reference to the drawings.

FIRST EMBODIMENT

Figure 1:
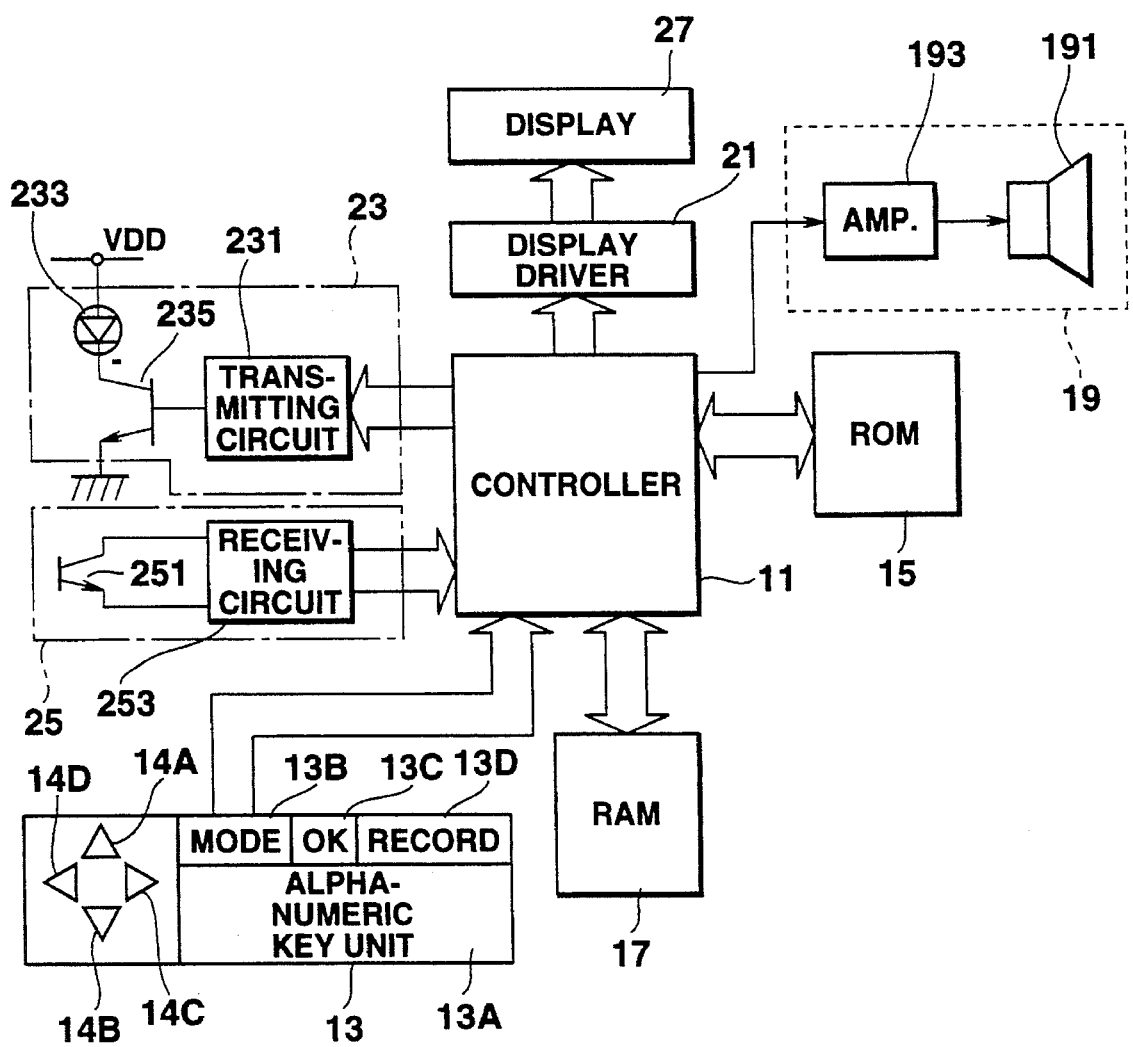
FIG. 1 is a block diagram indicative of the structure of an electronic game device as a first embodiment of the present invention.

FIG. 1 is a block diagram indicative of the structure of an electronic game device as a first embodiment of the present invention. The electronic game device of FIG. 1 is composed of a controller 11; and an input unit 13, and ROM 15, RAM 17, sounding unit 19, display driver 21, transmitter 23, and receiver 25 each connected to the controller 11 with a display 27 being connected to the display driver 21.

The controller 11 is composed of a central processing unit and its peripheral circuits, and controls the respective components of the device and executes the game programs shown by the flowchart of FIGS. 4–9.

The input unit 13 is composed of an alphanumeric key unit 13A which keys in characters/numerals; mode key 13B which sets an operational mode; OK key 13C which fixes the input; record key 13D which records various data; and upward cursor key 14A, downward cursor key 14B, rightward cursor key 14C and leftward cursor key 14D each used to designate a direction in which the cursor moves.

Figure 2:
FIG. 2 shows one example of a plurality of images of each of the parts of a human face stored in a ROM of FIG. 1.
Figure 2:
Figure 2:
Figure 2:
Figure 2:
Figure 2:
Figure 2:
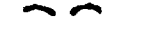
Figure 2:
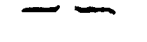
Figure 2:
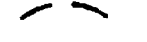
Figure 2:
Figure 2:
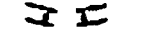
Figure 2:

As shown in FIG. 2, the ROM 15 contains programs which execute games, the processes of which are shown in FIGS. 4–9, and data on various images of each of the parts which constitute a human face. The parts of the human face are, for example, a contour, hair style, eyebrows, eyes, etc., with each image having a predetermined allocated parameter value (score).

As shown in FIG. 3, the RAM 17 is composed of a display register 17 which stores display data; mode register 173 which stores mode data; individuals' data area 175 which is capable of storing individuals' names, the numbers of the images of the parts which constitute a portrait (character) of each of individuals, and parameters indicative of a control, defensive force and luck degree of that individual used to play a game; a game data area of this side 177 which stores game data area of this side; and a game data area of the other side 179 which stores the game data of the other side.

The sounding unit 19 is composed of a speaker 191 and an amplifier 193 and produces an effect sound for a game under control of the controller 11.

The display driver 21 displays data stored in the display register 171 on the display 27 under control of the controller 11. The display 21 is composed, for example, of a dot matrix type liquid crystal display.

The transmitter 23 is composed of a transmitting circuit 231, light emitting element (diode) 233, and driver (transistor) 235 and transmits data delivered from the controller 11 to the other side.

The receiver 25 is composed of a receiving element (phototransistor) 251 and a receiving circuit 253, and receives data delivered from a transmitter 23 of an electronic game device of the other side and delivers the data to the controller 11 of this side.

The operation of the electronic game device, thus constructed, will be described with reference to flowcharts of FIGS. 4–9.

The electronic game device of this embodiment performs (1) a data inputting process where data is input and a portrait (or face montage) image is created from the data and recorded when a mode flag M set in the mode register 173 is "1"; and (2) a game process where a (soccer) game is played, using the portrait when the mode flag M is "0".

Figure 4:
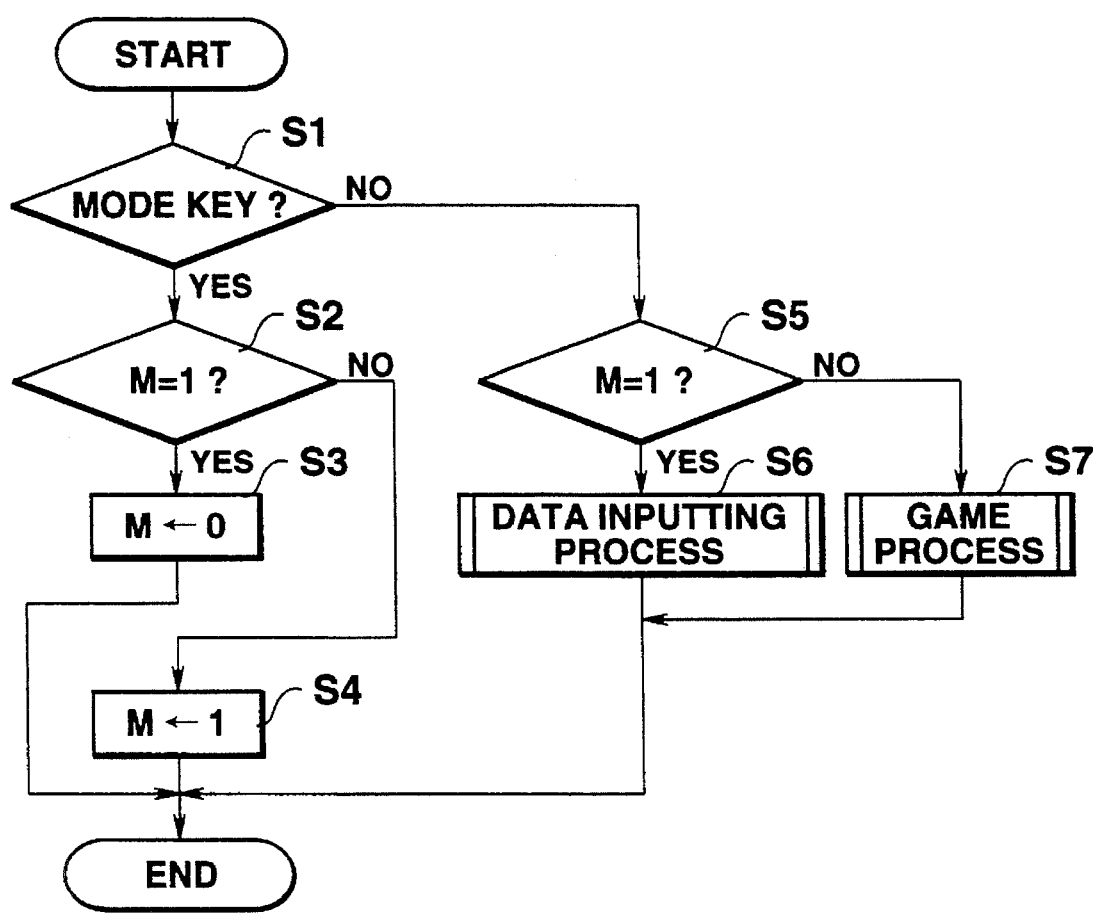
FIG. 4 is a flowchart indicative of the basic operation of the electronic game device of FIG. 1.

First, when any key of the input unit 13 is depressed, the kind of the depressed key is determined at step S1 of FIG. 4. When the depressed key is the mode key 13B, the value of the mode flag M is inverted to change the operational mode (steps S2–S4).

When the depressed key is other than the mode key 13B, the controller 11 determines the value of the mode flag M (step S5). If the value of the mode flag M is "1", the controller 11 performs the data inputting process (step S6). If the value of the mode flag M is "0", the controller 11 performs the game process (step S7).

The data inputting process performed at step S6 will be described with reference to FIG. 5. First, the controller 11 writes display data into the display register 171, and controls the display driver 21 to display a message that data should be input to the display 27 (step T1).

When a new portrait is to be created, the user operates the alphanumeric key unit 13A to key in the name of the portrait (steps T2, T3). When keying in the name ends, the user depresses the record key 13D so that the input name data is stored in an empty area of the individuals's data area 175 (step T4, T5).

The controller 11 then produces a portrait composed of combined No. 1 images of the different parts stored in the ROM 15 and displays the portrait along with the message that the portrait should partially be changed, if desired (step T6).

When there is any image to be changed, the user operates the upward and downward cursor keys 14A and 14B to select the part having that image (steps T7, T8) and operates the rightward and leftward cursor keys 14C and 14D to select any desired one of the images of the selected part (steps T9, T10). In accordance with the change of the image, the portrait is reconstructed and displayed (step T11).

When the created portrait is satisfactory, the user depresses the record key 13D. The controller 11 stores the image numbers of the respective parts which constitute the created portrait in the individuals' data area 175 in correspondence to the name stored at step T5 (steps T12, T13).

The controller 11 then calculates parameters of a control, defensive force and luck degree used in the game on the basis of the values allocated to the respective images which constitute the portrait in accordance with a predetermined operation expression (step T14). For example, the value of the control is the sum of the respective numerals allocated to the images of the contour, hair style and eyebrows.

The controller then stores the respective calculated parameter values in the corresponding locations of individuals' data area 175 (step T15). Control then returns to the main flow of FIG. 4 to thereby end the process.

Figure 5:
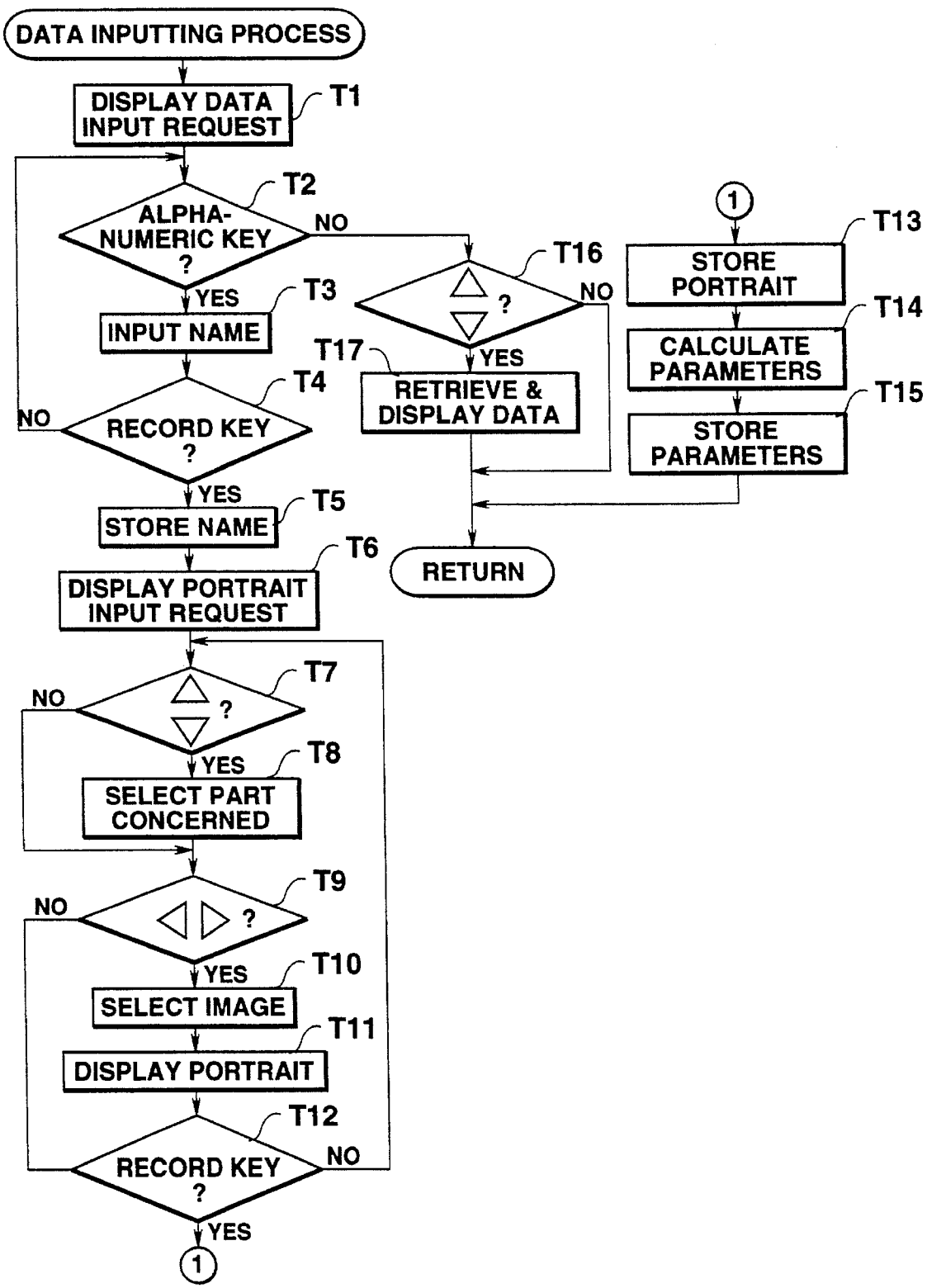
FIG. 5 is a flowchart indicative of the details of a data input process shown in FIG. 4.

When the upward or downward cursor key 14A or 14B is depressed in a state where the data input display is made at step T1 of FIG. 5, the controller sequentially retrieves and displays the stored data in accordance with the key depression (step T16, T17). Control then returns to the main flow of FIG. 4 to thereby end the process.

The game process performed at step S7 of FIG. 4 will be described next with reference to FIGS. 6–12.

FIGS. 6–9 are a flowchart indicative of the details of the game process. FIGS. 10–12 each show an example of display obeying the progress of the game.

The game played by this electronic game device will first be described. This game is played, using two electronic game devices of the same type and two respective portraits selected by those electronic game devices while making communication to each other.

First, the respective users select any desired portraits (soccer players) and inform each other of the selected portraits by communication. Both the users play a soccer penalty kick (PK) with the respective selected portraits. Parameters indicative of a control, defensive force and luck degree are set for each of the portraits. The control is the ability of the kicker (offense) while the defensive force is the keeper's ability. The luck degree influences both the abilities.

The offense user designates a point in the goal at which the user aims at and a position on the ball at which the user kicks the ball and starts offense (or kicks the ball). The defense user designates a position in the goal which the defense user defends (keeper's move), and defends the goal.

It is determined on the basis of the parameters and the designations of the offense and defense whether the ball enters the goal.

A predetermined number of offense and defense turns is played by exchanging the offense and defense alternately to decide victory and defeat.

Figure 10A:
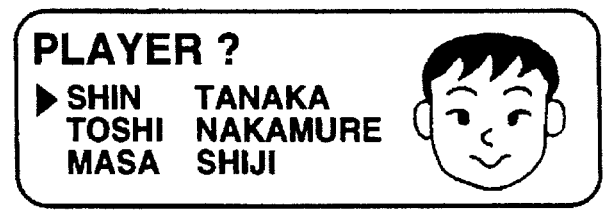
FIGS. 10A, 10B, 10C and 10D each show a displayed example of a scene occurring in a game played in the first embodiment.
Figure 10B:
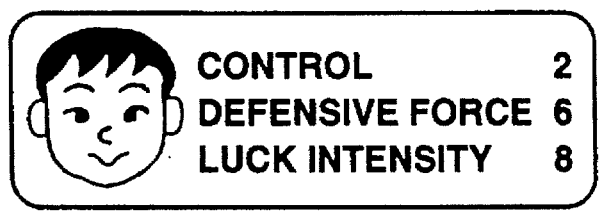

The process for playing the game will be described next. First, each user operates the upward and downward cursor keys 14A and 14B to retrieve the data stored in the individuals' data area 175 of the electronic game device thereof. This key operation is detected at step P1 and the result of the retrieval is displayed, for example, as shown in FIG. 10A (steps P1, P2). When a desired portrait is displayed, the user depresses the OK key 13C (step P3). In response to this key operation, the controller 11 displays on the display 27 the respective parameters set for the selected portrait, for example, as shown in FIG. 10B. Confirming the display, the user determines to play the game, using the portrait as a character (player), and then operates the OK key 13C. When the user changes the portrait, he operates the upward or downward cursor key 14A or 14B to perform the portrait selection process mentioned above (steps P1–P4).

In response to the operation of the OK key 13C, the controller 11 stores data on the numbers of the images of the respective parts which constitute the selected portrait, and data on parameters indicative of the control, defensive force and luck degree in the data area of this side 177 (steps P5, P6).

The controller 11 controls the transmitter 23 and receiver 25 on the controller side to make communication with the electronic game device of the other side to provide information on the portrait and the parameters selected by the control side for the other side and receives information on the parameters and the portrait selected by the other side (step P7). The transmission and reception of data are iterated until they end between both the opposing electronic game devices (steps P7, P8). In the transmission and reception process, it is determined which of both the users becomes the offense or defense at the beginning of the game.

Figure 10C:
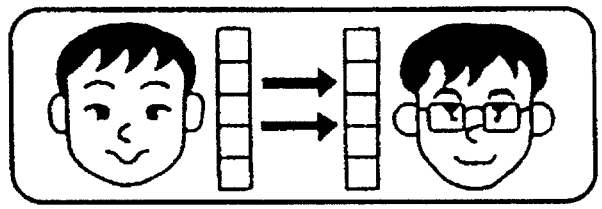

When the termination of the data transmission and reception is detected at step P8, that controller 11 stores the received data in the data area of the other side 179 on the control side and displays which of the portraits is the offense or defense, for example, as shown in FIG. 10C (step P9).

The controller 11 then determines whether the controller 11 itself is of the offense or defense (step P10). If the controller 11 is of the offense, control passes to step P11 while if the controller is of the defense, control passes to step P33.

Figure 10D:
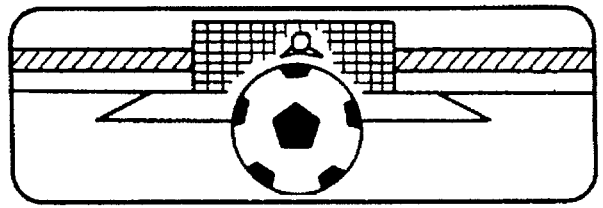

First, the operation of the offense will be described below. At step P11 the controller 11 displays the goal of the soccer game on the display 27 through the display driver 21. The user of the offense operates the cursor keys 14A–14D to select a desired one from among about ten preset positions in the goal at which the user aims at the goal (step P12). When this setting ends the user operates the OK key 13C, which is detected at step P13. Thus, the controller 11 displays on the display 27 concerned the goal and the ball, for example, as shown in FIG. 10D (step P14).

Figure 9:
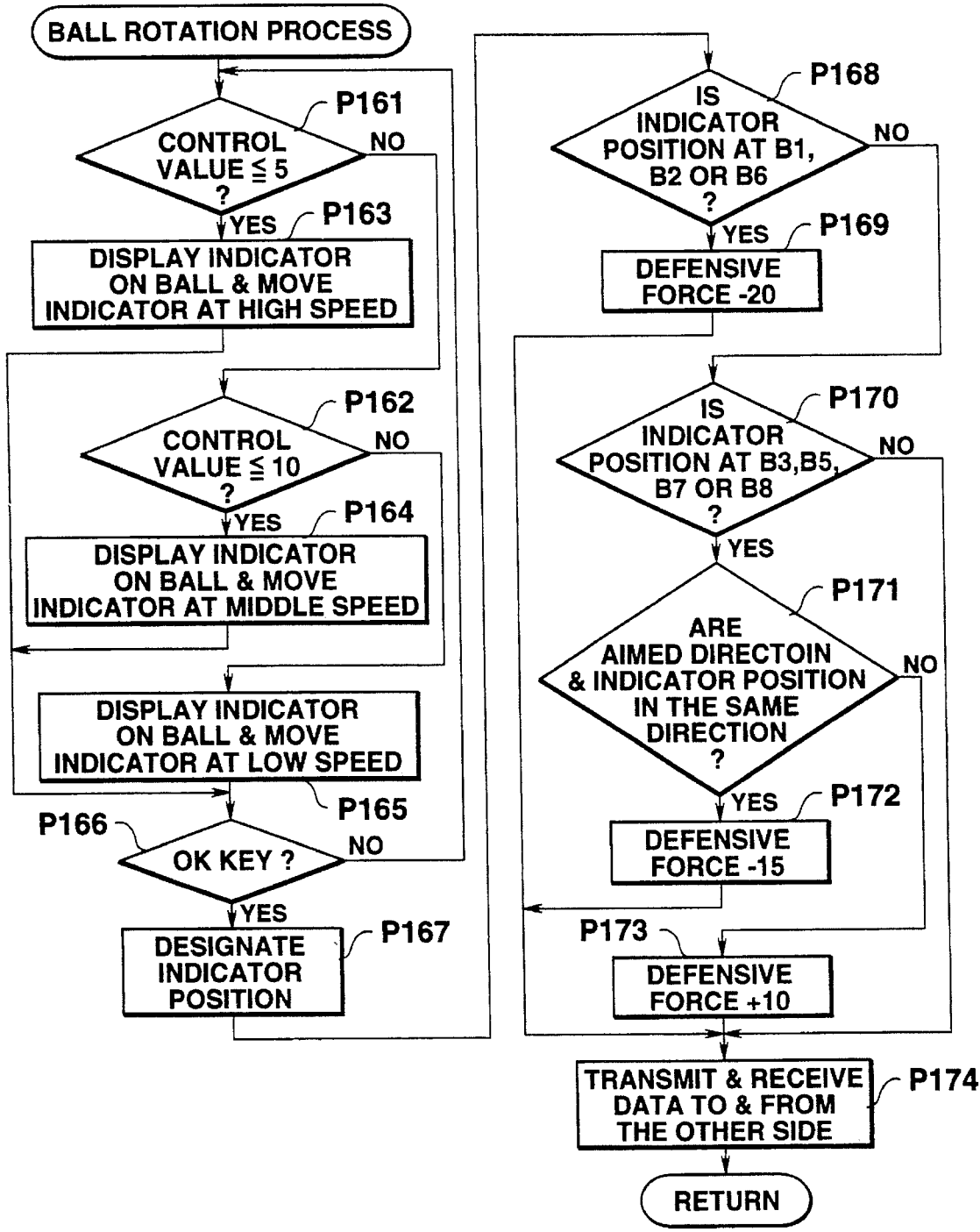
FIG. 9 is a flowchart indicative of the details of a ball rotation process of FIG. 7.

At this time, the user operates the OK key 13C, which is detected at step P15, so that the controller performs a ball rotation process at step P16, the details of which are shown in FIG. 9. This process at step P16 is performed in order to cause the user himself to select a position on the ball at which the offense kicks the ball (the percentage of success at which the ball enters a goal) so as to allow the user himself to influence the progress of the game and whether the ball enters the goal.

Figure 11A:
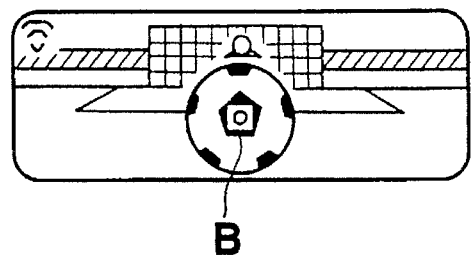
FIGS. 11A, 11B, 11C and 11D each show a further displayed example of a scene occurring in the game played in the first embodiment.
Figure 11B:
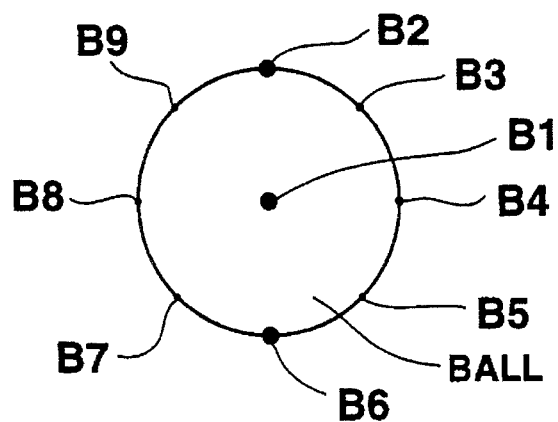

First, the controller 11 determines the control value of the parameters stored in the data area of this side 177 on the side thereof (steps P161, P162). When the control value is less than 5, the controller displays a moving indicator B on the ball and moves the indicator at high speed, for example, as shown in FIG. 11A (step P163). If the control value is 6–10, the controller moves the indicator at middle speed (steps P164). If the control value is more than 11, the controller moves the indicator at low speed (p165).

This indicator is used to designate a position where the kicker kicks the ball. The indicator moves at a designated speed through the respective positions shown enlarged in FIG. 11B in order of B2→B1→B3→B1→B4→B1→B5→B1→B6→B1→B7→B1→B8→B1→B9→B1→B2→B1...

The user operates the OK key 13C such that the indicator stops at an optimal position, while viewing the move of the indicator. This key operation is detected at step P166 at which time the position of the indicator is designated (P167). The controller 11 determines the position of the indicator. When the position of the indicator is at B2, B3 or B9, the controller decreases the defensive force of this side by 20 (steps P168, P169). If the indicator position is at B4, B5, B7 or B8, the controller 11 compares the direction set at step P12 where the goal is aimed at with the position of the indicator on the ball. If both are in the same direction, the controller decreases the defensive force on the side thereof by 15. If both are in opposite directions, the controller decreases the defensive force by 10 (steps P170–P173). Thus, the probability that the ball will enter the goal changes in dependence on the stopping position of the indicator.

The controller 11 then communicates the aiming position set at step P12 and the parameters of the defensive forces set at step P169, P172 and P173 to the other side through the transmitter 23 and the receiver 25 (step P174). Thereafter, control passes to step P17 of FIG. 7.

Figure 11C:
Figure 11D:
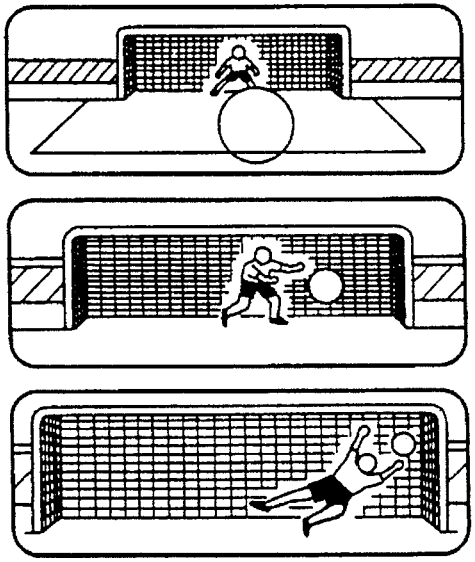

At step P17 the controller 11 displays a shooting scene, for example, as shown in FIG. 11C, and moves the keeper and ball in correspondence to the received data and input data at step P18, for example, as shown in FIG. 11D.

The controller then determines whether the keeper and the position in which the ball is kicked are in the same direction (step P19). If not, control passes to step P22 to be described later.

If the keeper and the position in which the ball is kicked are in the same direction, the controller compares the parameters of the opposing sides. In more detail, the controller calculates a parameter RA which indicates the defensive force on the side thereof minus the parameter value of the defensive force of the other side and a parameter RB which indicates the luck degree on the controller side minus the parameter value indicative of the luck degree of the other side (step P20). The controller determines whether the sum of RA and RB is greater than 0. If so, the controller determines that the ball on the side thereof has reached the goal (step P21).

Figure 12A:
FIGS. 12A, 12B, 12C, 12D and 12E each show a still further displayed example involved in the game played in the first embodiment.
Figure 12B:

When the controller determines at step P21 that the ball has entered the goal, or at step P19 that the keeper and the position in which the ball is kicked are in the opposite directions, the controller determines whether the user on the side thereof is the offense (step P22). If so, the controller displays a goal, for example, as illustrated in FIG. 12A, to thereby add to the score (step P23). If the user is the defense, its controller displays that the defense's goal has been entered by the offense's ball, as illustrated in FIG. 12B (step P24).

Figure 12C:
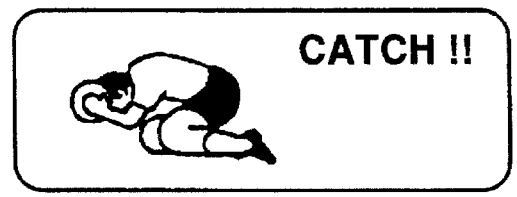
Figure 12D:

If the offense's ball fails to enter the goal, the controller displays that the kicked ball has been caught, as illustrated in FIG. 12C (steps P25, P26). If the user is the defense, the controller displays that the keeper has caught the ball, as illustrated in FIG. 12D (steps P25, P27).

After the indication process at steps P23, P24, P26 and P27, the controller restores the defense–s parameters to their original values (step P28) and determines whether a victory or defeat in a penalty kick was decided (step P29).

Figure 12E:
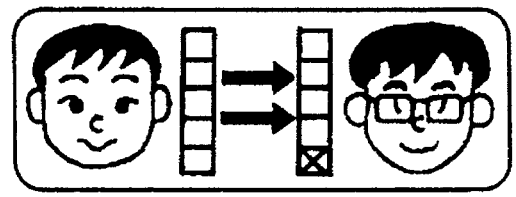

If so, a report on the victory or defeat is displayed to thereby terminate the game (step P30). If not, both the opposing sides' scores are displayed, as shown in FIG. 12E (step P31) and the offense and defense are exchanged (step P32). Control then returns to step P10, where the game continues.

Figure 6:
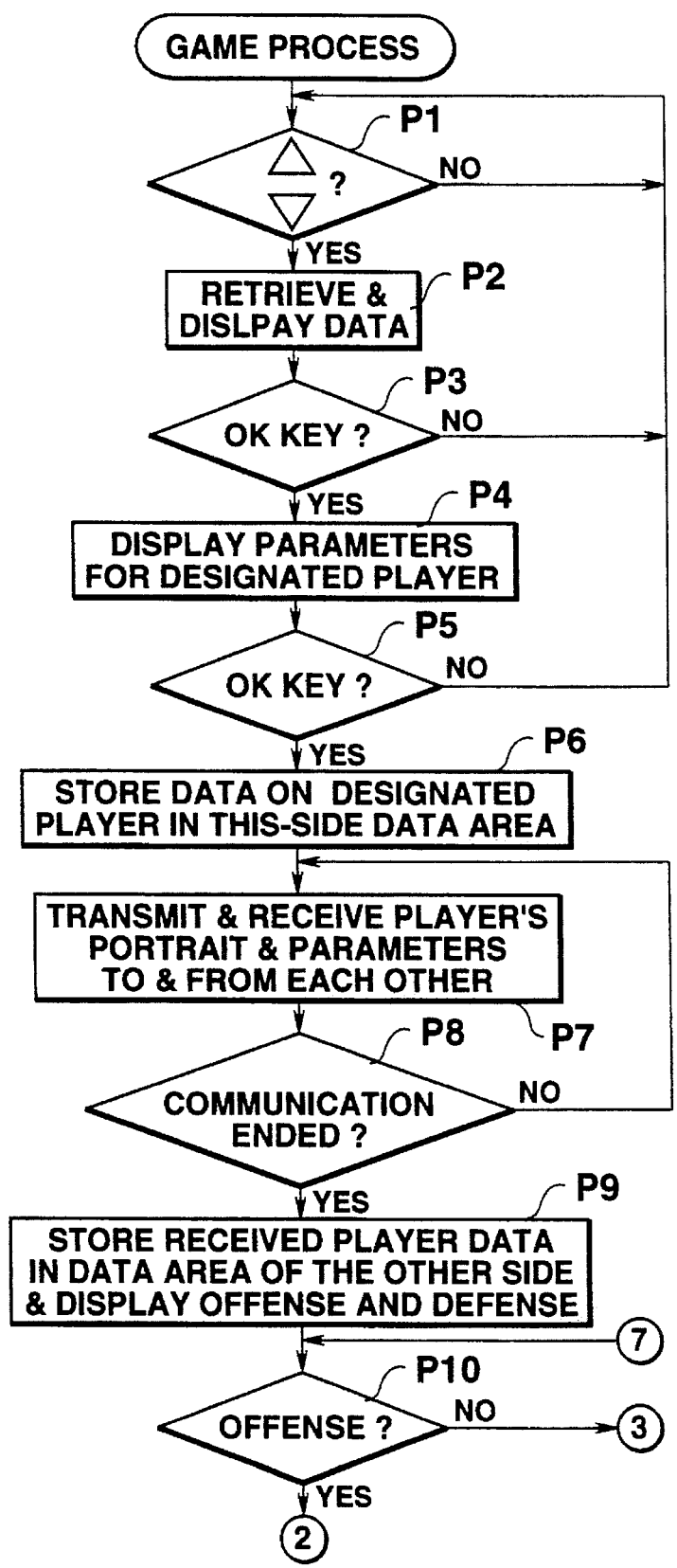
FIG. 6 is a flowchart indicative of a first part of a game process performed in the first embodiment.
Figure 7:
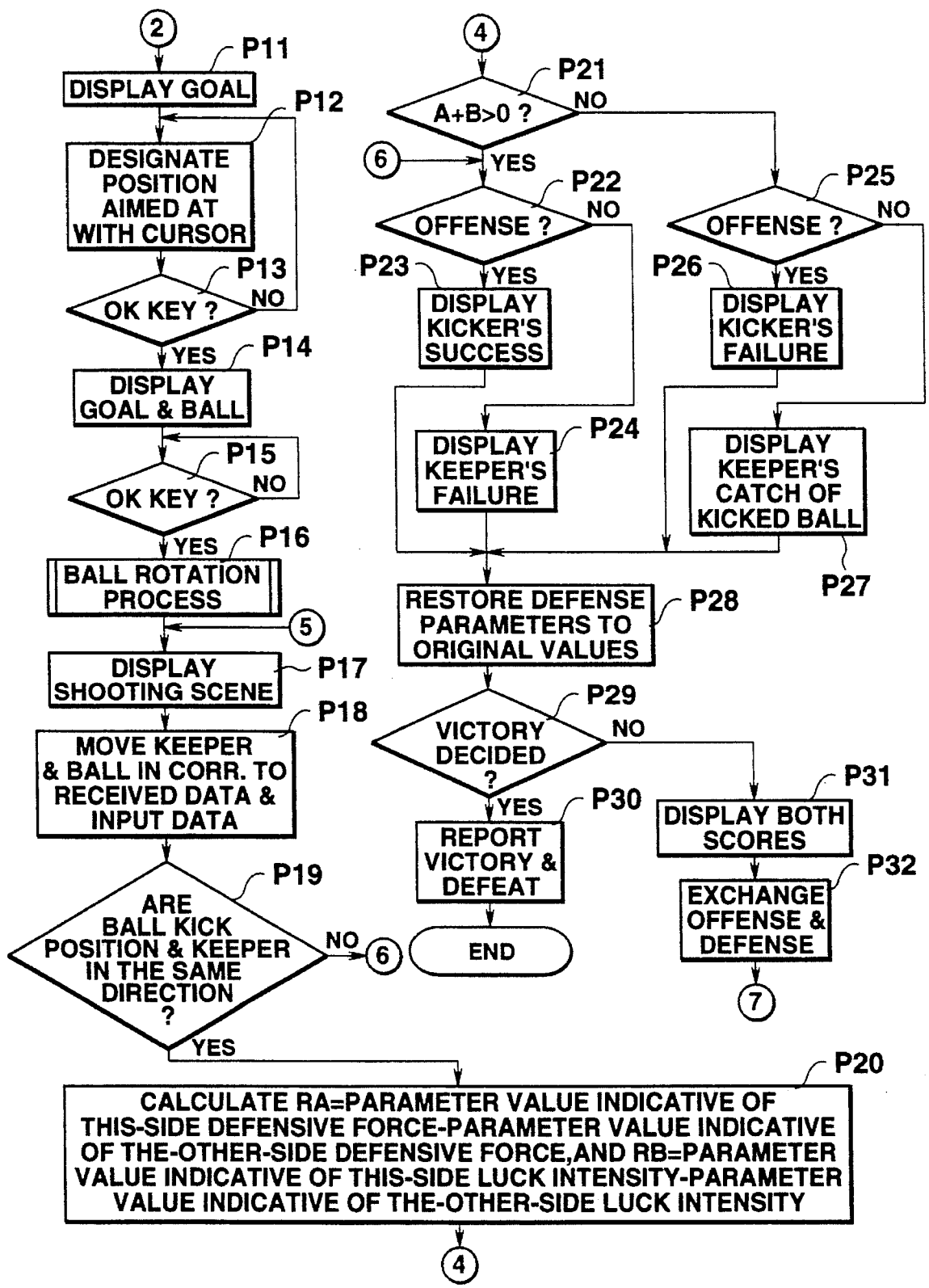
FIG. 7 is a flowchart indicative of the remaining part of the game process continued from the flowchart of FIG. 6.
Figure 8:
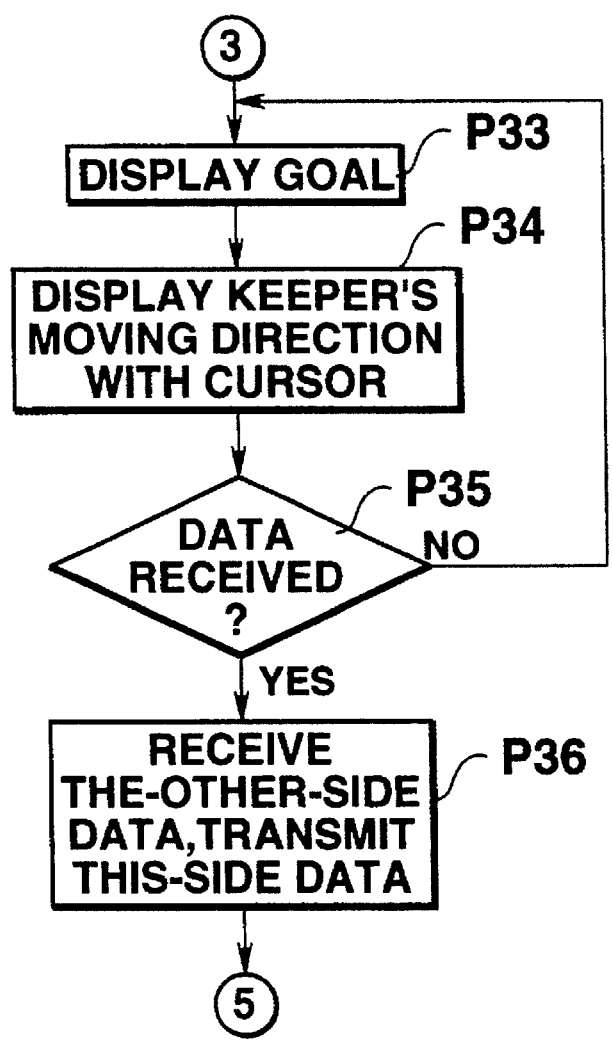
FIG. 8 is a flowchart indicative of a further part of the game process combined with those parts of the game process of FIGS. 6 and 7.

When the controller determines at step P10 of FIG. 6 that it is of the defense, control passes to step P33 of FIG. 8, where the controller displays the goal on the display 27. The user of the defense operates the rightward and leftward cursor keys 14C and 14D to indicate the keeper's moving direction (step P34). Subsequently, the controller 11 waits for arrival of data from the electronic Game device of the other side.

When the controller receives data from the other side, it transmits data on the keeper's moving direction to the other side (steps P35, P36). Control then passes to step P17 of FIG. 7.

As described above, according to the electronic game devices of this embodiment, the users are able to create portraits and enjoy a penalty kick, using the portraits and directly participate in the progress of the game and influence the results of the game, so that the users experience an interesting game.

While in the embodiment the moving speed of the indicator on the ball is controlled on the basis of the parameter "control" allocated to the portrait, the indicator may be moved on the goal such that the user may depress the OK key 13C, for example, in the designation process of the aiming position performed at step P12 to determine the aiming position. Also, in this case, the moving speed of the indicator is controlled, for example, on the basis of parameter "control". The moving direction of the keeper designated at step P34 may be indicated by the indicator.

SECOND EMBODIMENT

While in the first embodiment the example of application of the invention to the soccer game has been illustrated, the invention is applicable to other games. A second embodiment of the invention applied to a basket ball game will be described below. The electronic game device of the second embodiment is the same in structure as that of the first embodiment of FIGS. 1–3.

The game played in the electronic game device of the second embodiment will be described. This game is played by two players through the corresponding electronic game devices while communicating requested data, using selected portraits.

The respective users select any portrait (basket-ball player) and communicate the selected portraits to each other. The respective portraits selected by both the users alternately play offense and defense and each offense shoots the ball five times in all. When the game is a draw a free, throw is made alternately until victory or defeat is decided. In the present embodiment, a shoot power (which determines the percentage of success in shooting) is used as a parameter for deciding victory or defeat.

The process for playing this game will be described next. As in the first embodiment, the respective opposing users select portraits as players at steps P1–P6 of FIG. 6. The respective controllers 11 make communication with each other to provide information on the selected portraits and parameters (steps P6–P8). When the completion of the transmission/reception is detected at step P8, the controller 11 stores the received data in the data area of the other side 179 and displays which of the portraits is the offense or defense, for example, as shown in FIG. 10C (step P9).

Figure 13:
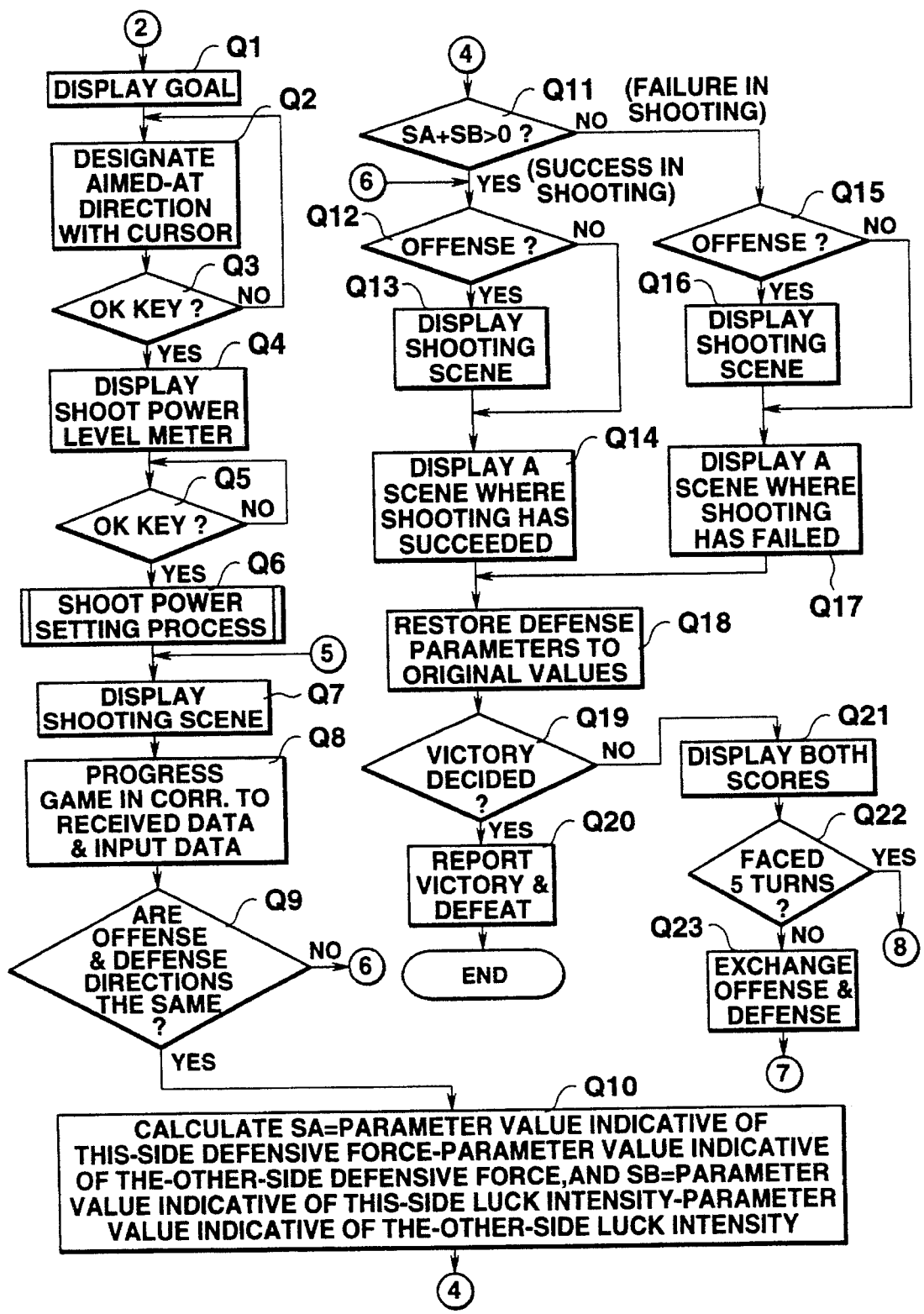
FIG. 13 is a flowchart indicative of the details of an offense process performed in a second embodiment of the present invention and continued from the flowchart of FIG. 6.

Each controller 11 determines whether it is of the offense or defense (step P10). If it is of the offense, control passes to step Q1 of FIG. 13 while if it is the defense, control passes to step Q25 of FIG. 14.

Figure 17A:
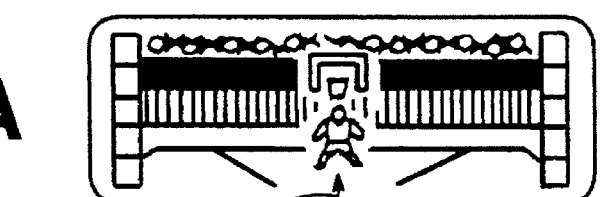
FIGS. 17A, 17B and 17C each show an illustrative scene occurring in a game.

First, the operation of the offense will be described next. At step Q1 the controller 11 of the offense displays a basketball goal, player of the defense and arrow-like indicator 41 indicative of the offense direction, as shown in FIG. 17A, on the display 27 through the display driver 21. The user of the offense operates the cursor keys 14A–14D to move the indicator 41 to set the direction in which the player aims at the goal (step Q2).

Figure 17B:
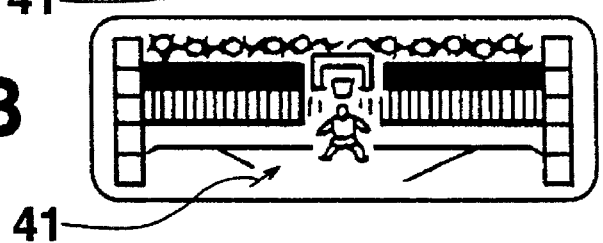
Figure 17C:
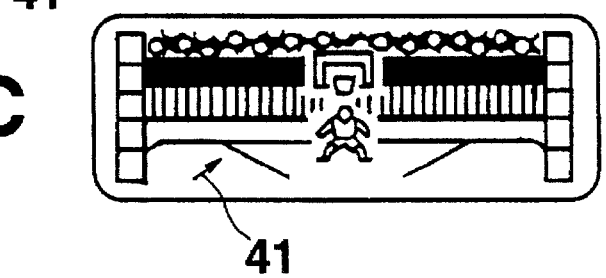

Five selectable directions in which the player aims at the goal are set which are the front of the goal shown in FIG. 17A, the direction of connecting a left-hand position before the goal and the right-hand goal post in FIG. 17B, the direction of connecting a more left-hand position before the goal and the left-hand goal post shown in FIG. 17C, the direction of connecting a right-hand position before the goal and the left-hand goal post, and the direction of connecting a more right-hand position before the goal and the right-hand goal post. When the selection of any desired one of the five directions ends, the user of the offense operates the OK key 13C.

Figure 16:
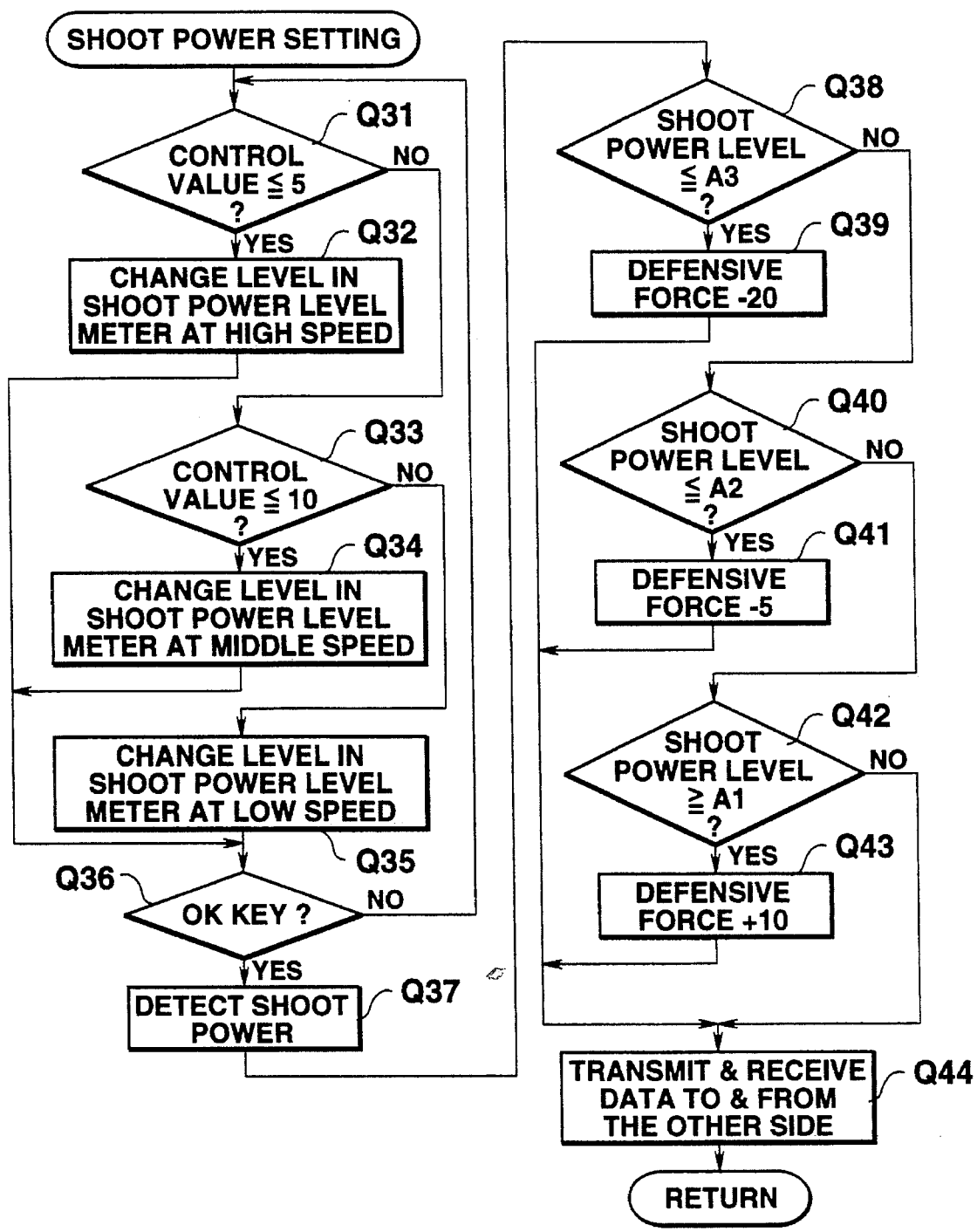
FIG. 16 is a flowchart indicative of the details of a shoot power setting process of FIG. 13.

This key operation is detected at step Q3, where the controller 11 of the offense shows the shoot power level meter 271 at the left end of the display screen, for example, as shown in FIG. 19A (step Q4). This shoot power level meter 271 is used to cause the user himself to determine the percentage of success in shooting indirectly. Confirming the display on the display screen, the user of the offense operates the OK key 13C, which is detected at step Q5 and hence a shoot power setting process Q6, the details of which are shown in FIG. 16, is performed.

The shoot power setting process at step Q6 which allows the user (player) of the offense to influence the progress of the game and the success/failure in reaching the goal will be described with reference to FIG. 16.

First, the controller 11 of the offense determines the control value stored in data area of the offense 177 (steps Q31, Q33). If the control value is equal to, or less than, 5, the controller 11 extends/compresses a black band of the shoot power level meter 271 (FIGS. 19A, 19B) at high speed as shown in FIG. 20A–D (step Q32). When the control value is 6–10, the controller 11 extends/compresses the black band at middle speed (step Q34). When the control value is equal to, or more than, 11, the controller 11 extends/compresses the black band at low speed (step Q35).

The user of the offense operates the OK key 13C so that the length of the black band of the shoot power level meter 271 is maximized. The controller 11 of the offense detects this key operation at step Q6 and detects the length of the black band (shoot power level) of the shoot power level meter 271 at the time (step Q37). The controller 11 compares the detected shoot power level with predetermined reference values A1–A3. As shown in FIG. 20(A), when the shoot power level is less than the reference value A3, the controller 11 decreases by −20 the defensive force of the offense stored in the data area of this side 177 (steps Q38, Q39). When the shoot power level is equal to, or more than, the reference value A3 and less than A2, as shown in FIG. 20(B), the controller 11 decreases the defensive force by 5 (steps Q40, Q41). When the shoot power level is equal to, or more than, the reference value A2 and less than the reference value A1, as shown in FIG. 20(C), the controller 11 maintains the defensive force as it is (steps Q40, Q41). As shown in FIG. 20(D), the shoot power level is equal to, or more than, the reference value A1, the controller 11 increases the defensive force by 10 (steps Q42, Q43).

The controller 11 of the offense transmits through the transmitter 23 and receiver 25 of the offense data on the direction set at step Q2 in which the offense aims at the goal and the defensive force corrected and set at steps Q31 and Q43 to the other side (defense) (step Q44). The controller 11 of the offense also receives from the other side data on the defensive position set at step Q26 of FIG. 14 to be described later in more detail. Thereafter, control passes to step Q7 of FIG. 13.

Figure 21A:
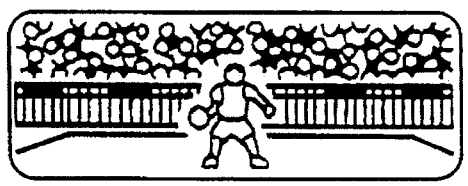
FIGS. 21A, 21B and 21C each show an illustrative scene occurring in a game.
Figure 21B:
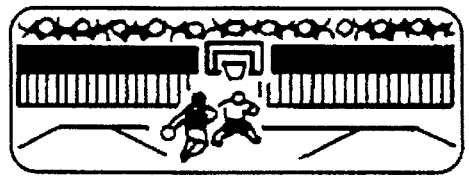
Figure 21C:
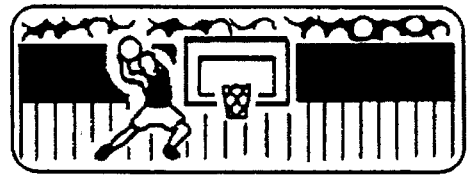

At step Q7 the controller of the offense displays a shooting scene on the display 27, for example, as shown in FIG. 21A. Subsequently, the controller 11 of the offense moves the players in accordance with the direction set at step Q2 in which the offense aims at the goal and the data (on the defensive position of the defense to be described later in more detail) received at step Q44, as shown in FIGS. 21B and 21C, to thereby progress the game (step Q8).

The controller 11 of the offense determines whether the offense and defense directions are the same (step Q9). If not, control passes to step Q12. If so at step Q9, the controller 11 of the offense compares the offense and defense parameters (step Q10). In more detail, the controller of the offense calculates a parameter PA which is the value of the defensive force of the offense minus the value of the defensive force of the defense and a parameter PB which is the luck degree of the offense minus the luck degree of the defense. The controller of the offense determines whether the sum of the parameters PA and PB is greater than 0. If so, the controller 11 determines that the ball has entered the goal (success in shooting) (step Q11).

Figure 22A:
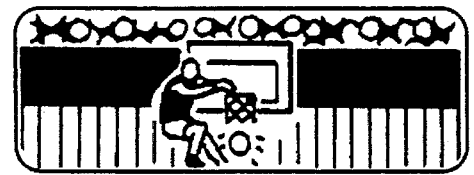
FIGS. 22A, 22B, 22C and 22D each show another illustrative scene occurring in the game.
Figure 22B:

When the controller 11 of the offense determines the success in shooting at step Q11, or at Q9 that the offense and defense (keeper) directions are different, it determines whether the player is of the offense (step P12). If so, the controller 11 of the offense displays a shooting scene shown in FIG. 22A on the display 27 (step Q13). Subsequently, it also displays on the display 27 a scene indicative of the success in shooting, as shown in FIG. 22B, and adds to the score (step Q14). If the player is of the defense, the controller 11 on the side thereof displays on the display 27 of the defense side a scene where shooting has succeeded, shown in FIG. 22B (step Q14).

Figure 22C:
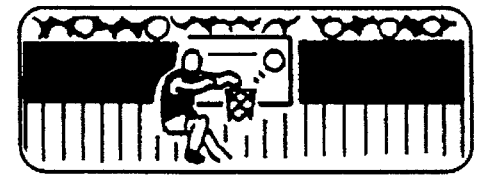
Figure 22D:
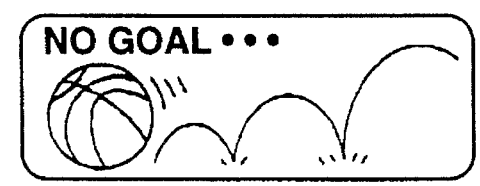

If shooting fails and the player is of the offense, the controller 11 of the offense displays on the display 27 a scene in which the shooted ball has rebounded, as shown in FIG. 22C (step Q16), and displays a scene where shooting has failed, as shown in FIG. 22D (step Q17). If shooting fails and the player is of the defense, the controller of the defense displays "No goal" on the display of the defense, as shown in FIG. 22D (step Q17).

After the display at step Q14 or Q17, the controller 11 of the offense restores the parameters of the defense corrected at step Q6 to their original values (step Q18). Thereafter, the controller 11 determines whether victory and defeat were decided (step Q19).

Figure 23:
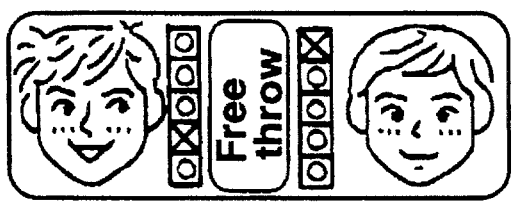
FIG. 23 shows an illustrative display of scores.

If so, the controller 11 displays a report on the victory/defeat on the display 27 to thereby end the game (step Q20). If not at step 19, the controller displays the respective scores of the opposing sides, as shown in FIG. 23 (step Q21).

Subsequently, the controller determines whether the offense and defense each have been performed five times (step Q22). If not, the offense and defense are exchanged (step Q23). Subsequently, control returns to step P10 of FIG. 6, where the game continues.

The determination of YES at step Q22 is made when the game ends and the scores of both the sides are the same, in which case a free throw is made to decide victory or defeat. Control then passes to step Q51 of FIG. 15 to be described later in more detail.

Figure 14:
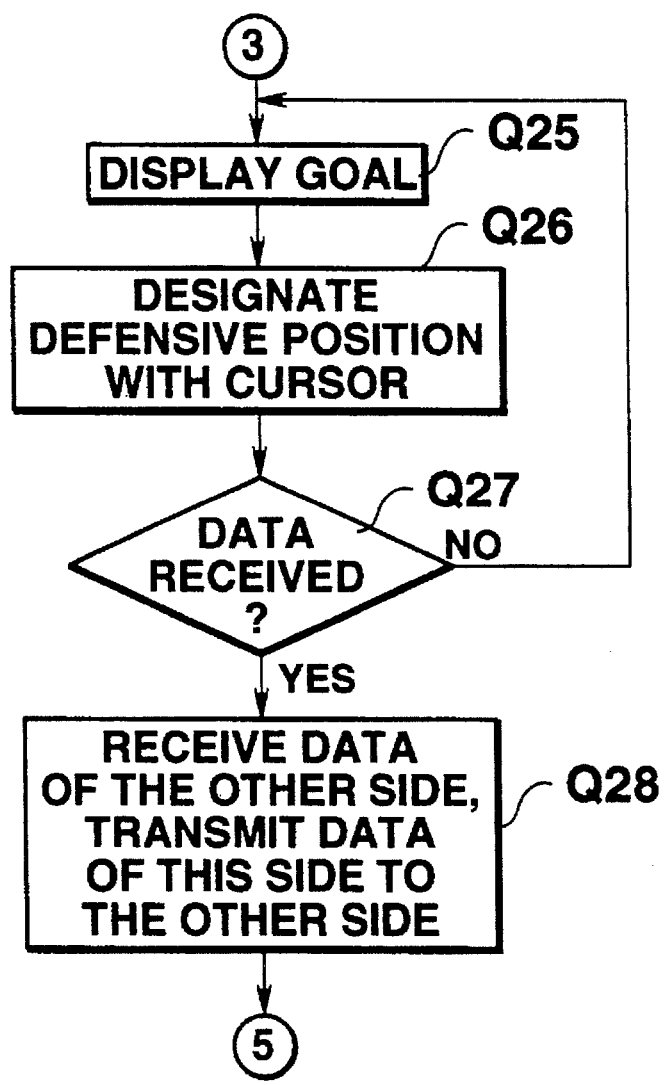
FIG. 14 is a flowchart indicative of the details of a defense process performed in the second embodiment of the present invention and related to the flowcharts of FIGS. 6 and 13.
Figure 18A:
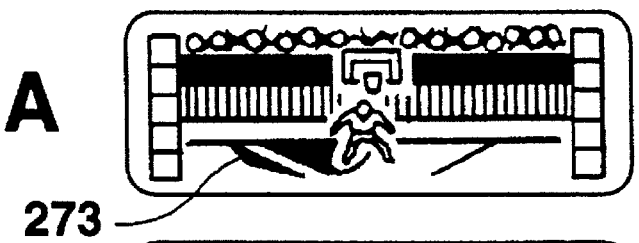
FIGS. 18A, 18B and 18C each show a further illustrative scene occurring in the game.
Figure 18B:
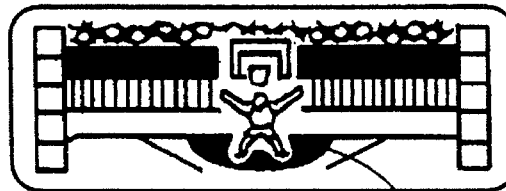
Figure 18C:
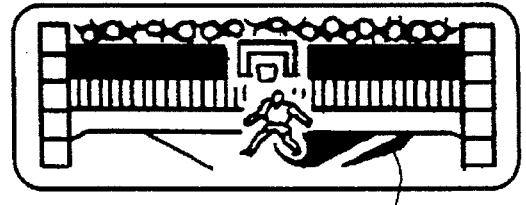

When the controller 11 determines that the user thereof is of the defense at step P10 of FIG. 6, control passes to step Q25 of FIG. 14, where the controller 11 displays the goal and defense on the display 27. The user of the defense operates the cursor keys 14A–D to instruct the controller to give a shadow 273 to the defensive position of the defense, as shown in FIGS. 18A–18C (step Q26). The defensive position is selected from among the central, right and left ones.

Subsequently, the controller 11 waits for arrival of data from the electronic game device of the other side at step Q44 (step Q27).

The controller 11 receives from the other side data on a direction in which the other side aims at the goal of the defense and the corrected defensive force of the other side, and delivers data on the defensive position of the defense designated at step Q26 to the other side (step Q28). Control then passes to step Q7 of FIG. 13, where the controller continues the game.

Figure 15:
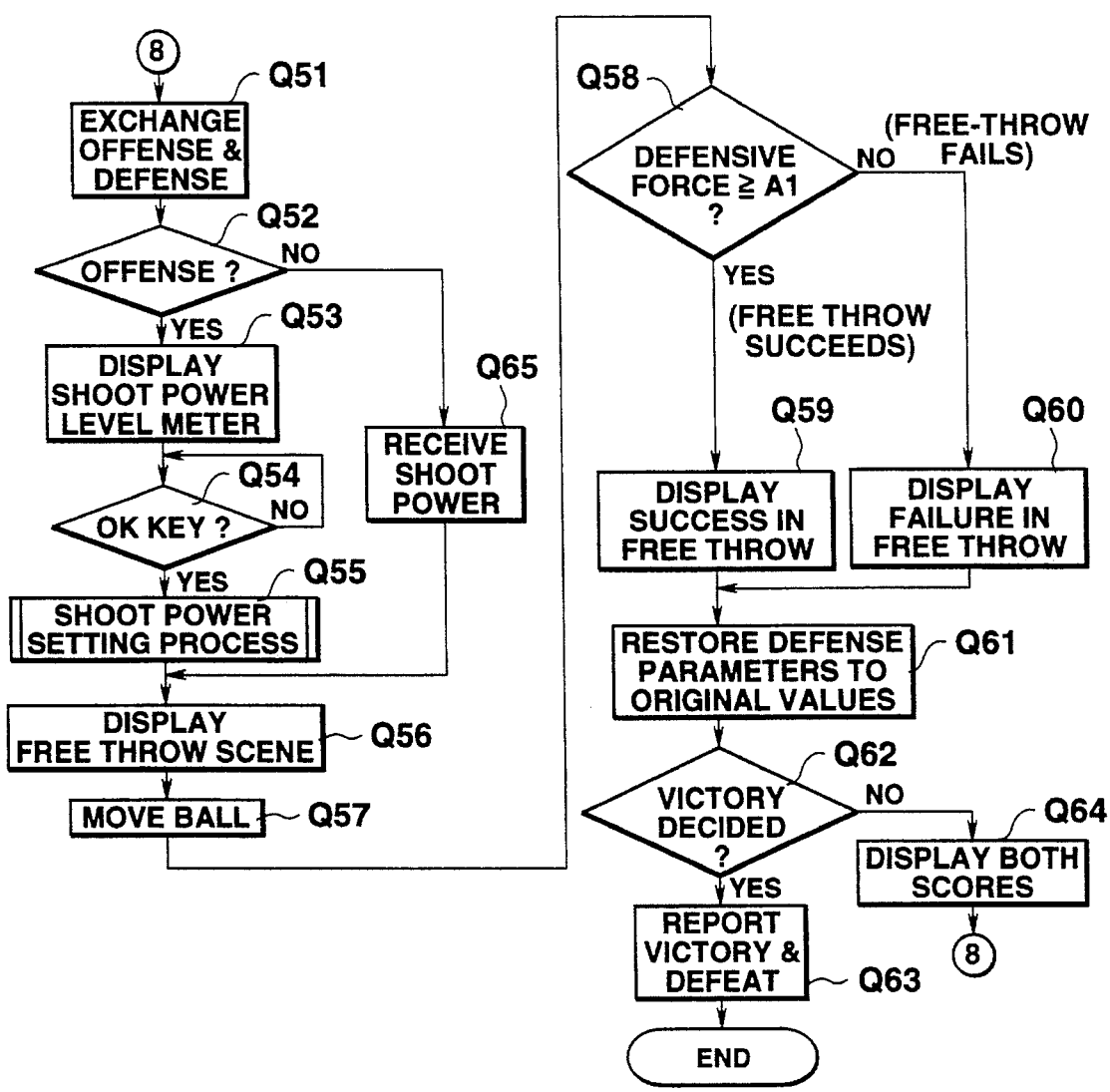
FIG. 15 is a flowchart indicative of the details of a free throw process performed in the second embodiment of the present invention and related to the flowchart of FIG. 13.

The free throw of FIG. 15 will be described next. First, at step Q51 the offense and defense are exchanged by each other. Thereafter, at step Q52 the controller 11 determines whether this side is of the offense or defense. If this side is of the offense, the controller 11 of this side displays the goal, defense player, and shoot power level meter 271 of the other side, for example, as shown in FIGS. 19A and 19B on the display 27 (step Q53). In response to this display, the user operates the OK key 13C, which is detected at step Q54 and a shoot power setting process at step Q55, the details of which are shown in FIG. 16, is performed.

Figure 24A:
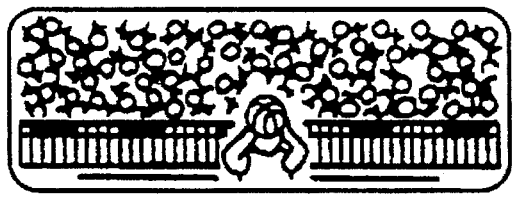
FIGS. 24A, 24B, 24C, 24D, 24E and 24F each show an illustrative scene occurring in a game.
Figure 24B:
Figure 24C:
Figure 24D:
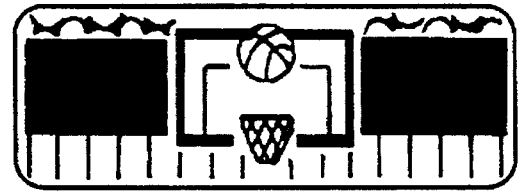

Subsequently, the controller 11 displays a scene of a free throw on the display 27, for example, as shown in FIGS. 24A and 24B (step Q56) and moves the ball, as shown in FIGS. 24C and 24D (step Q57). Subsequently, the controller 11 determines whether the defensive force of the offense set in the shoot power setting process at step Q55 is equal to, or more than, the reference value A1. If so, the controller 11 determines that the free throw has succeeded (step Q58).

Figure 24E:
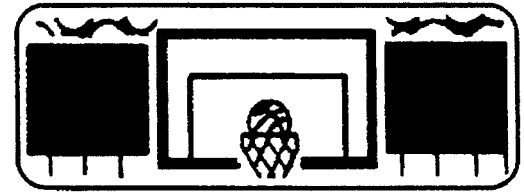
Figure 24F:

When the controller 11 determines the success in the free throw at step Q58, the controller 11 displays on the display 27 the success in the free throw, for example, as shown in FIGS. 24E and 24F, and adds to the score (step Q59). If the free throw fails, the controller displays the failure in the free throw, for example, as shown in FIG. 22D (step Q60).

After the display at steps Q59, Q60, the controller 11 restores the defensive parameters to their original values (step Q61). Thereafter, the controller 11 determines whether victory or defeat has been decided (step Q62).

If so, a report on the victory or defeat is displayed to thereby end the game (step Q63). If not, the controller displays the scores of both the opposing sides (step Q64). Control then returns to step Q51, where the game continues.

When the controller determines at step Q52 that this side is of the offense, the controller receives the shoot power set at step Q55 from the electronic game device of the other side (step Q65). Control then passes to step Q56.

As described above, according to the electronic game devices of this embodiment, portraits (of players) are created and both opposing users are able to enjoy a basketball game, using the portraits. In addition, since the users directly participate in the progress of the game and influence the result of the game, the users are able to experience an interesting game.

While the present embodiment has illustrated that the controller controls the moving (extending/compressing) speed of the shoot power level meter 271 on the basis of the parameter "control" allocated to the portrait of the offense, the controller may adjust the moving speed of the level meter 271 in accordance with other parameters.

While in the present embodiments application of the present invention to a penalty kick of a soccer game and to a basketball game has been illustrated, the invention is applicable to other games.

For example, in a golf game, the controller may control a position and direction where the ball is hit by stopping the moving indicator, and hence a success in putting the ball into the cup. In addition, in a baseball game, the controller may control a position where the batter hits a ball by stopping the indicator, or control the course of a ball which the pitcher throws by stopping the indicator to thereby control the progress of the game.

In the first embodiment, the indicator is moved on the ball or the goal while in the second embodiment the length of the indicator is extended/compressed. However, the form of the indicator is not limited to those particular ones. If the indication (indication value) is changeable, any type of indicator may be used. For example, the color of the indicator may be changed or a numerical value indicative of the defensive force (the percentage of success in shooting) may be displayed and changed.

The inventive electronic game device is applicable not only to devices dedicated to games, but also to various other devices such as, for example, electronic notebooks, word processors, label printers, etc., which have the function of creating any desired image of a portrait by selecting its part images from among a plurality of beforehand stored images of each of the parts which constitute a portrait.

What is claimed is:

1. An electronic soccer game device for playing a penalty kick game, the device comprising:

a player data memory for storing plural player data of players which take part in a soccer game;

a parameter memory for storing parameters corresponding respectively to the plural player data stored in said player data memory, the parameters being different from one another;

player selecting means for selecting player data which is to take part in the soccer game from among the plural player data stored in said player data memory;

first parameter reading means for reading out from said parameter memory a parameter corresponding to the player data selected by said player selecting means;

ball displaying means for displaying a ball to be used in the penalty kick game;

point displaying means for displaying and moving a point onto the ball displayed by said ball displaying means at a speed corresponding to the parameter read out by said first parameter reading means;

point stopping means for stopping the point being moved by said point displaying means to indicate a position where the ball displayed by said ball displaying means is to be kicked; and first goal control means for determining based on the position indicated by said point stopping means whether a goal is successful or not.

2. An electronic soccer game device as claimed in claim 1, further comprising:

goal post displaying means for displaying a goal post;

shoot position indicating means for indicating a position to kick the ball displayed by said ball displaying means at the goal post displayed by said goal post displaying means;

judging means for judging whether the position indicated by said point stopping means is located at a suitable position for the position indicated by said shoot position indicating means; and second goal control means for determining based on the result of the judgement made by said judging means whether a goal is successful or not.

3. An electronic soccer game device as claimed in claim 2, further comprising:

goal keeper displaying means for displaying a goal keeper; and direction setting means for setting a moving direction in which the goal keeper displayed by said goal keeper displaying means is moved; and wherein:

said second goal control means comprises penalty kick control means for comparing the moving direction of the goal keeper set by said direction setting means with the result of the judgement made by said judging means to determine whether a goal is successful or not.

4. An electronic soccer game device as claimed in claim 3, wherein:

said goal keeper displaying means comprises:

competitor player selecting means for selecting from among the plural player data stored in said player data memory a player data of a player as a competitor player who competes with the player data selected by said player selecting means;

competitor player parameter reading means for reading out from said parameter memory a parameter corresponding to the player data of the competitor player selected by said competitor player selecting means; and competitor player displaying means for displaying the player data of the competitor player selected by said competitor player selecting means; and said second goal control means comprises:

comparison control means for comparing with one another the moving direction of the goal keeper set by said direction setting means, the result of the judgement made by said judging means, the parameter of the player data read out by said first parameter reading means and the parameter of the competitor player read out by said competitor player parameter reading means to determine whether a goal is successful or not.

5. An electronic soccer game device as claimed in claim 3, wherein said penalty kick control means compares with one another the moving direction of the goal keeper set by said direction setting means, the result of the judgement made by said judging means and the parameter of the player data read out by said first parameter reading means to determine whether a goal is successful or not.

6. An electronic soccer game device as claimed in claim 3, further comprising:

an external control device for sending keeper data for setting a moving direction in which in the goal keeper displayed by said goal keeper displaying means is moved in a penalty kick game; and receiving means for receiving the keeper data sent from said external control device; and wherein:

said direction setting means sets in accordance with the keeper data received by said receiving means a moving direction in which the goal keeper displayed by said goal keeper displaying means is moved;

whereby said electronic soccer game device competes with said external control device in the penalty kick game.

7. An electronic soccer game device as claimed in claim 1, wherein:

said player data memory comprises a part pattern memory for storing plural part pattern data for each of parts composing a player;

said parameter memory comprises a pattern parameter memory for storing plural parameters corresponding respectively to the plural part pattern data stored in said part pattern memory;

said player selecting means comprises:

part pattern selecting means for selecting part pattern data for each of the parts composing a player from among the plural part pattern data stored in said part pattern memory; and player composing means for combining the part pattern data selected by said part pattern selecting means to compose a player who takes part in a game;

said first parameter reading means comprises:

pattern parameter reading means for reading out from said parameter memory parameters corresponding respectively to part pattern data selected by said part pattern selecting means; and parameter composing means for combining the parameters read out by said pattern parameter reading means to compose a parameter of the player composed by said player composing means; and said point displaying means moves the point at a velocity corresponding to the parameter composed by said parameter composing means.

8. An electronic basketball game device comprising:

a player data memory for storing plural player data of players which take part in a basketball game;

a parameter memory for storing parameters corresponding respectively to the plural player data stored in said player data memory, the parameters being different from one another;

player selecting means for selecting player data which is to take part in the basketball game from among the plural player data stored in said player data memory;

first parameter reading means for reading out from said parameter memory a parameter corresponding to the player data selected by said player selecting means;

display-member displaying means for displaying and moving a display member at a velocity corresponding to the parameter read out by said parameter reading means, the display member being provided for setting a shooting strength;

shot-strength setting means for stopping the display member being moved by said display-member displaying means to set the shot strength; and first shot control means for determining based on the shot strength set by said shot strength setting means whether a shot is successful or not.

9. An electronic basketball game device as claimed in claim 8, further comprising:

court displaying means for displaying a court;

shot position designating means for designating a position to release a shot in the court displayed by said court displaying means;

judging means for judging whether the shot strength set by said shot-strength setting means is suitable for the position designated by said shot position designating means; and second shot control means for determining based on the result of the judgement made by said judging means whether a shot is successful or not.

10. An electronic basketball game device as claimed in claim 9, further comprising:

competitor displaying means for displaying a competitor;

direction setting means for setting a moving direction in which the competitor displayed by said competitor displaying means is moved; and competitor moving means for moving the competitor displayed by said competitor displaying means in the moving direction set by said direction setting means; and wherein:

said second shot control means comprises basket control means for comparing the moving direction of the competitor set by said direction setting means with the result of the judgement made by said judging means to determine whether a shot is successful or not.

11. An electronic soccer game device as claimed in claim 10, wherein:

said competitor displaying means comprises:

competitor player selecting means for selecting from among the plural player data stored in said player data memory a player data of a player as a competitor player who competes with the player data selected by said player selecting means; and competitor player displaying means for displaying the player data of the competitor player selected by said competitor player selecting means;

said first parameter reading means comprises:

competitor player parameter reading means for reading out from said parameter memory a parameter corresponding to the player data of the competitor player selected by said competitor player selecting means; and said second shot control means comprises:

comparison control means for comparing with one another the moving direction of the competitor set by said direction setting means, the result of the judgement made by said judging means, the parameter of the player data read out by said first parameter reading means and the parameter of the competitor player read out by said competitor player parameter reading means to determine whether a shot is successful or not.

12. An electronic basketball game device as claimed in claim 10, further comprising:

an external control device for sending competitor data for setting a moving direction in which the competitor player is moved in a basketball game;

receiving means for receiving the competitor data sent from said external control device; and wherein:

said direction setting means sets in accordance with the competitor data received by said receiving means a moving direction in which the competitor displayed by said competitor moving means is moved;

whereby said electronic basketball game device competes with said external control device in the basketball game.

13. An electronic basketball game device as claimed in claim 8, wherein:

said player data memory comprises a part pattern memory for storing plural part pattern data for each of parts composing a player;

said parameter memory comprises a pattern parameter memory for storing plural parameters corresponding respectively to the plural part pattern data stored in said part pattern memory;

said player selecting means comprises:

part pattern selecting means for selecting part pattern data for each of the parts composing a player from among the plural part pattern data stored in said part pattern memory; and player composing means for combining the part pattern data selected by said part pattern selecting means to compose a player who takes part in a game;

said first parameter reading means comprises:

pattern parameter reading means for reading out from said parameter memory parameters corresponding respectively to part pattern data selected by said part pattern selecting means; and parameter composing means for combining the parameters read out by said pattern parameter reading means to compose a parameter of the player composed by said player composing means; and said display-member displaying means moves the display member at a velocity corresponding to the parameter composed by said parameter composing means.

14. In an electronic soccer game device for playing a penalty kick game, the device having a memory for storing plural players and plural parameters corresponding respectively to the plural players and a display unit, a method of playing an electronic soccer game, comprising the steps of:

selecting a player from among the plural players stored in said memory;

selecting a player as a competitor player from among the plural players stored in said memory;

reading a parameter corresponding to the selected player;

reading a parameter corresponding to the selected player as the competitor player;

displaying a goal post on said display unit;

displaying a ball on said display unit;

designating a position from which a shot is released at the displayed goal post;

displaying a point on said display unit;

moving the displayed point at a velocity corresponding to the parameter of the selected player;

stopping the moving point; and comparing with one another the position where the point member is stopped, the designated position for releasing a shot, the parameter of the selected player and the parameter of the player selected as the competitor player to move the ball.

15. In an electronic basketball game device having a memory for storing plural players and plural parameters corresponding respectively to the plural players and a display unit, a method of playing an electronic basketball game comprising the steps of:

selecting a player from among the plural players stored in said memory;

selecting a player as a competitor player from among the plural players stored in said memory;

reading a parameter corresponding to the selected player;

reading a parameter corresponding to the selected player as the competitor player;

displaying a basket on said display unit; designating a position from which a shot is released at the displayed basket;

displaying a display member on said display unit;

moving the displayed display member at a velocity corresponding to the parameter of the selected player;

stopping the moving display member; and comparing with one another the position where the display member is stopped, the designated position for releasing a shot, the parameter of the selected player and the parameter of the player selected as the competitor player to move a basketball.

* * * * *